United States Patent Office 3,359,254
Patented Dec. 19, 1967

3,359,254
ORGANO-MERCURIC COMPLEXES OF DIARYL THIOCARBAZONES
John Kazan, Jr., Somerville, N.J., assignor to American Cyanamid Company, Stamford, Conn., a corporation of Maine
No Drawing. Filed May 22, 1964, Ser. No. 369,613
5 Claims. (Cl. 260—149)

ABSTRACT OF THE DISCLOSURE

Compounds of the formula:

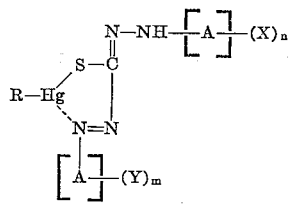

wherein R is a member selected from the group consisting of lower hydroxyalkyl and hydroxy aryl of less than three six-membered rings; "A" is a member selected from the group consisting of phenyl and naphthyl; n and m are whole numbers between 0 and 3 inclusive; and X and Y are members selected from the group consisting of lower alkyl, hydroxy, lower alkoxy, phenoxy, phenyl, phenylazo, nitro, amino, sulfo and halo radicals.

---

This invention relates to, and has for its object, the provision of a new class of compounds. More particularly, this invention relates to new organo-mercuric complexes of diaryl thiocarbazones which can be incorporated in a transparent or translucent material such as cellulose acetate to give a colored polymer which is suitable for the manufacture of variable transmissive, or photochromic, sunglass lenses.

The compounds which are provided for by the present invention are represented by the following Formula I:

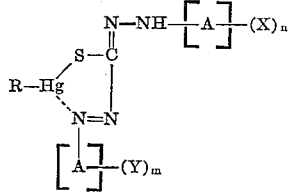

wherein "A" is phenyl or naphthyl; X and Y are individually either lower alkyl, hydroxy, lower alkoxy, phenoxy, phenyl, phenylazo, nitro, amino, sulfo or halo; n and m are each 0, 1, 2 or 3; and R is either hydroxy-lower-alkyl or hydroxy aryl.

The organo-mercuric complexes of this invention can be prepared by the reaction of an organo-mercuric salt and a diaryl thiocarbazone in the presence of a buffer. This reaction is illustrated by the following equation:

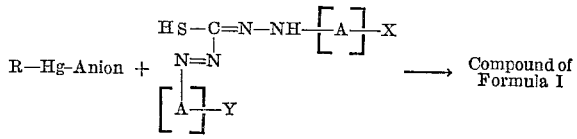

wherein R, "A," X and Y are as defined above and the anion is chloride, bromide, iodide, acetate, nitrate, bisulfate, and the like.

This reaction proceeds at 15° C. to 40° C. to give the product in good yield. As buffering materials, there may be used sodium carbonate, sodium bicarbonate, sodium acetate or sodium biphosphate. It is necessary to have a reaction diluent such as benzene, chloroform or methylene chloride. A two-phase solvent system is usually used in the reaction. To an equal volume mixture of one of the above solvents and water, is added the buffer, diaryl thiocarbazone and the mercury compound. The mixture is stirred for approximately a few hours at room temperature. The organic layer is separated, washed with water and a base such as ammonium hydroxide and dried. After the solvent is removed, the residue is purified by the usual procedures.

Representative of the organo-mercuric salts that can be used in the foregoing procedure are hydroxy-loweralkyl mercuric salts such as hydroxyethylmercuric chloride, acetate, or nitrate, 2,3-dihydroxypropylmercuric chloride, iodide or bromide, 2-hydroxycyclohexylmercuric chloride, 6-hydroxyhexylmercuric chloride, and hydroxyphenyl or hydroxynaphthylmercuric salts such as p-hydroxyphenylmercuric chloride, 2-hydroxyphenylmercuric chloride, bromide, acetate or sulfate, 2,4-dihydroxyphenylmercuric acetate or bisulfate, 5-hydroxy-o-tolylmercuric acetate, 4-fluoro-2-hydroxyphenylmercuric sulfate or acetate, 1-hydroxy-2-naphthylmercuric chloride, 2-hydroxy-1-naphthylmercuric acetate and 3-hydroxy-4-methyl-1-naphthylmercuric sulfate.

In general, it should be noted that the anionic portion of the mercuric salt is completely non-determinitive of the photochromic properties of the final mercuric complex useful in the present invention. All that is required is that the mercuric salt, whatever the anion, is soluble in a reaction medium from which compounds of Formula I are obtained.

The diaryl thiocarbazones which can be used to prepare the hydroxy-organo mercuric complexes of the present invention are embraced by the formula:

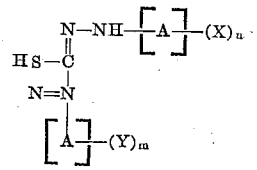

wherein "A," X, Y, m and n are as defined above. The simplest member of this series is dithizone which is N,N'-diphenylthiocarbazone or, alternatively, (phenylazo)thioformic acid 2-phenylhydrazide. The corresponding N,N'-dinaphthylthiocarbazones are also useful. Additionally useful are the analogs of the foregoing compounds having lower alkyl, halo, hydroxy, phenoxy, phenylazo, nitro, amino, phenyl, sulfo or lower alkoxy groups.

Suitable diaryl thiocarbazones include N,N'-diphenylthiocarbazone (dithizone), N,N'-bis(p-bromophenyl)thiocarbazone, N,N' - bis(p-chlorophenyl)thiocarbazone, N,N'-bis(o-iodophenyl)thiocarbazone, N,N' - di - p-tolylthiocarbazone, N,N'-di-m-tolylthiocarbazone, N,N'-di-2,4-xylylthiocarbazone, N,N' - bis(4 - bromo-2-tolyl)thiocarbazone, N,N'-bis(o-methoxyphenyl)thiocarbazone, N,N'-bis(o-ethoxyphenyl)thiocarbazone, N,N' - bis(3,4,5 - trimethoxyphenyl)thiocarbazone, N,N' - bis(p-phenoxyphenyl)thiocarbazone, N,N'-bis(o-methylthiophenyl)thiocarbazone, N,N'-bis(p-nitrophenyl)thiocarbazone, N,N'-bis-(p-aminophenyl)thiocarbazone, N,N' - bis(p-phenylazophenyl)thiocarbazone, N,N' - bis(p-sulfophenyl)thiocarbazone, N,N'-di-2-biphenylylthiocarbazone, N,N'-di-1-naphthylthiocarbazone, N,N'-di-2-naphthylthiocarbazone. The diaryl thiocarbazone can be prepared by the method of Hubbard and Scott, J. Am. Chem. Soc. 65, 2390 (1943).

The following examples are presented to illustrate the present invention.

EXAMPLE 1

*2-hydroxyphenyl[(phenylazo) thioformic acid 2-phenylhydrazidato]mercury*

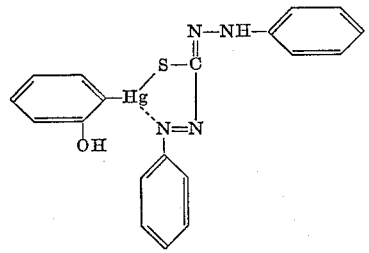

To a hot solution of 2.0 parts (0.0061 mole) of o-hydroxyphenylmercuric chloride in 50 parts of ethanol, there is added 1.56 parts (0.0061 mole) of dithizone. The reaction mixture is then refluxed for about 15 minutes, cooled and filtered to isolate the red product, which, after crystallization from a mixture of tetrahydrofuran and chloroform, has a melting point of 233–234° C.

EXAMPLE 2

*2,4-dihydroxyphenyl [(phenylazo)thioformic acid 2-phenylhydrazidato]mercury*

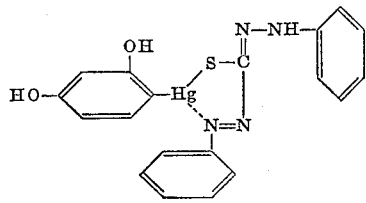

To a hot solution of 2.4 parts (0.00674 mole) of 2,4-dihydroxyphenylmercuric chloride in 50 parts of ethanol there is added 1.73 parts (0.00674 mole) of dithizone. Refluxing is continued for 15 minutes, and the resulting red-orange precipitate is separated from the cooled reaction mixture. The product after recrystallization melts at 237° C. (decomp.).

EXAMPLE 3

*2-hydroxyethyl[(phenylazo)thioformic acid 2-phenylhydrazidato]mercury*

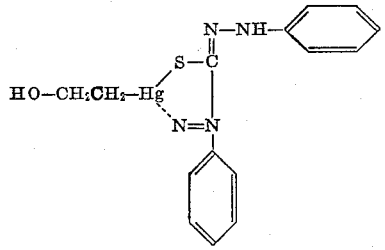

Ethylene is passed through a solution of 5.0 parts (0.0157 mole) of mercuric acetate in 50 parts of water containing sodium bicarbonate until mercuric oxide is no longer formed. The mixture is filtered, and the filtrate containing 2-hydroxyethylmercuric acetate is combined with 150 parts of benzene, 4 parts of sodium bicarbonate and 4.0 parts (0.0157 mole) of dithizone. After stirring for four hours at room temperature, the benzene layer is separated, washed with water and aqueous ammonia. Evaporation of the benzene gives an orange-red product melting at 136.5–137.5° C. after crystallization from benzene-hexane mixture.

EXAMPLE 4

*2-hydroxycyclohexyl[(phenylazo)thioformic acid 2-phenylhydrazidato]mercury*

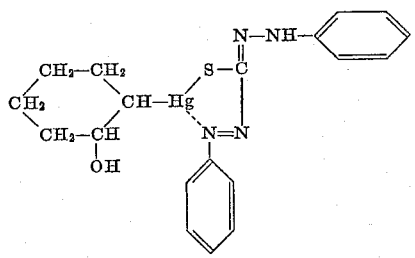

A mixture of 12 parts of water, 15 parts of benzene, 1.2 parts of sodium bicarbonate, 1.6 parts (0.005 mole) of 2-hydroxycyclohexylmercuric acetate and 1.2 parts (0.005 mole) of dithizone is stirred for two hours at room temperature. The benzene layer is separated and washed with water and aqueous ammonia. Evaporation of the benzene and recrystallization of the residue from ethanol gives an orange crystalline product melting at 87–89° C.

EXAMPLE 5

*2-hydroxyphenyl[(2-ethylphenylazo)thioformic acid 2-(2-ethylphenyl)hydrazidato]mercury*

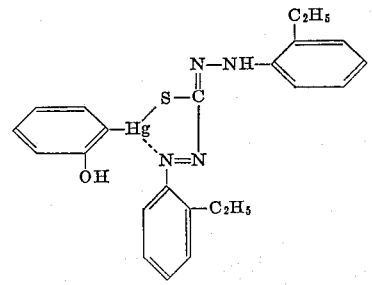

The procedure of Example 1 is followed substituting an equivalent amount of N,N'-bis(2-ethylphenyl)thiocarbazone for the dithizone.

The N,N'-bis(2-ethylphenyl)thiocarbazone is prepared by the method of Hubbard and Scott, J. Am. Chem. Soc. 65, 2390 (1943), using o-ethylaniline.

EXAMPLE 6

*2-hydroxycyclohexyl[(4-chlorophenyl)thioformic acid 2-(4-chlorophenyl)hydrazidato]mercury*

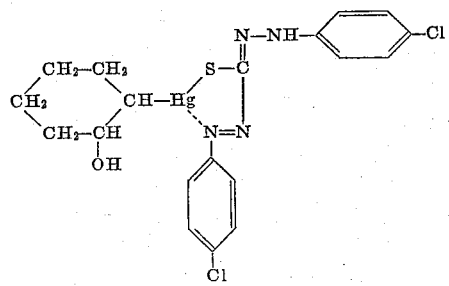

The procedure of Example 4 is followed substituting an equivalent amount of N,N'-bis(p-chlorophenyl)thiocarbazone for the dithizone. The N,N'-bis(p-chlorophenyl) thiocarbazone is prepared by the procedure of Hubbard and Scott, J. Am. Chem. Soc. 65, 2390 (1943), using p-chloroaniline.

EXAMPLE 7

*2,4 - dihydroxyphenyl[(4 - hydroxyphenylazo)thioformic acid 2-(4-hydroxyphenyl)hydrazidato]mercury*

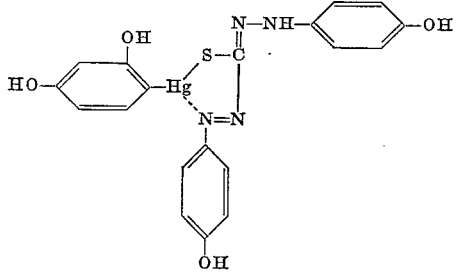

The procedure of Example 2 is followed substituting an equivalent amount of N,N'-bis(p-hydroxyphenyl)thiocarbazone for the dithizone. The N,N'-bis(p-hydroxyphenyl)thiocarbazone is prepared by the procedure of Hubbard and Scott, J. Am. Chem. Soc. 65, 2390 (1943), using p-aminophenol.

EXAMPLE 8

*2-hydroxyphenyl[(2-methoxyphenylazo)thioformic acid 2-(2-methoxyphenyl)hydrazidato]mercury*

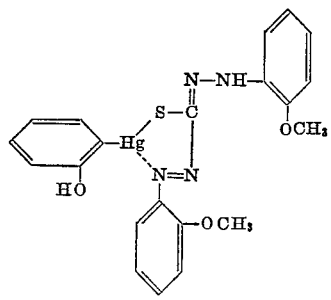

The procedure of Example 1 is followed substituting an equivalent amount of N,N'-bis(o-methoxyphenyl)thiocarbazone for the dithizone.

EXAMPLE 9

*2-hydroxyphenyl[(2-naphthylazo)thioformic acid 2-(2-naphthyl)hydrazidato]mercury*

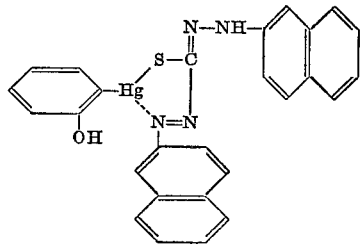

The procedure of Example 1 is followed substituting an equivalent amount of N,N'-bis(2-naphthyl)thiocarbazone for the dithizone.

I claim:
1. A compound of the formula:

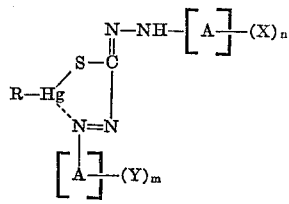

wherein R is a member selected from the group consisting of lower hydroxyalkyl, hydroxyphenyl and hydroxynaphthyl radicals; "A" is a member selected from the group consisting of phenyl and naphthyl; $n$ and $m$ are whole numbers between 0 and 3 inclusive; and X and Y are members selected from the group consisting of lower alkyl, hydroxy, lower alkoxy, phenoxy, phenyl, phenylazo, nitro, amino, sulfo and halo radicals.

2. The compound of the formula:

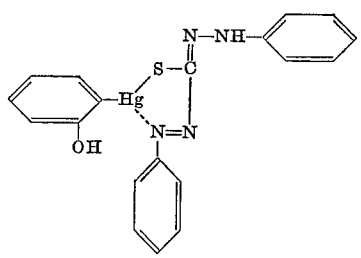

3. The compound of the formula:

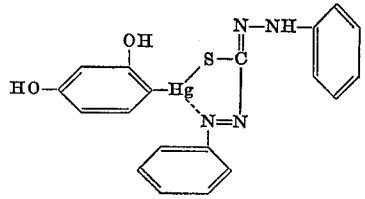

4. The compound of the formula:

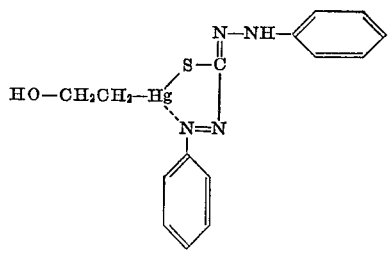

5. The compound of the formula:

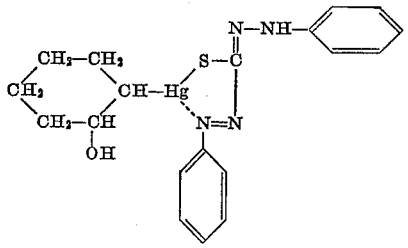

No references cited

FLOYD D. HIGEL, *Primary Examiner.*
CHARLES B. PARKER, *Examiner.*

UNITED STATES PATENT OFFICE
CERTIFICATE OF CORRECTION

Patent No. 3,359,254                               December 19, 1967

John Kazan, Jr.

It is hereby certified that error appears in the above numbered patent requiring correction and that the said Letters Patent should read as corrected below.

Column 2, lines 36 to 43, the formula should appear as shown below instead of as in the patent:

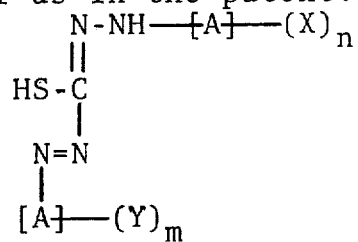

Signed and sealed this 18th day of February 1969.

(SEAL)
Attest:

Edward M. Fletcher, Jr.                         EDWARD J. BRENNER
Attesting Officer                                   Commissioner of Patents